(12) United States Patent
Song et al.

(10) Patent No.: US 8,380,379 B2
(45) Date of Patent: Feb. 19, 2013

(54) WALKING ASSISTIVE SYSTEM

(75) Inventors: Kai-Tai Song, Hsinchu (TW); Sin-Yi Jiang, Taipei County (TW); Ko-Tung Huang, Changhua County (TW)

(73) Assignee: National Chiao Tung University, Hsinchu (TW)

( * ) Notice: Subject to any disclaimer, the term of this patent is extended or adjusted under 35 U.S.C. 154(b) by 337 days.

(21) Appl. No.: 12/902,626

(22) Filed: Oct. 12, 2010

(65) Prior Publication Data

US 2011/0282529 A1 Nov. 17, 2011

(30) Foreign Application Priority Data

May 17, 2010 (TW) ................................ 99115734 A

(51) Int. Cl.
*B62D 51/04* (2006.01)
*A61G 5/05* (2006.01)
(52) U.S. Cl. .......... 701/22; 701/408; 701/301; 180/19.2
(58) Field of Classification Search .................. None
See application file for complete search history.

(56) References Cited

U.S. PATENT DOCUMENTS

| | | | |
|---|---|---|---|
| 6,518,718 | B2 | 2/2003 | Koga et al. |
| 7,204,328 | B2 * | 4/2007 | LoPresti ........................ 180/6.5 |
| 7,386,365 | B2 | 6/2008 | Nixon |
| 2006/0048980 | A1 * | 3/2006 | Kataoka et al. ............... 180/19.2 |
| 2009/0045021 | A1 * | 2/2009 | Einbinder ...................... 188/2 D |

FOREIGN PATENT DOCUMENTS

| | | |
|---|---|---|
| TW | 395305 | 6/2000 |
| TW | 274239 | 2/2007 |
| TW | 357400 | 5/2009 |

OTHER PUBLICATIONS

Yasuhisa Hirata, Asami Hara, Kazuhiro Kosuge, "Motion Control of Passive Intelligent Walker Using Servo Brakes," IEEE Transactions on ROBOTICS, vol. 23, No. 5, Oct. 2007.
Chen-Yang Lin, "Compliance Control of a Walking Helper Based on Motor Current Measurement" Oct. 2008.

* cited by examiner

*Primary Examiner* — Michael J. Zanelli
(74) *Attorney, Agent, or Firm* — Che-Yang Chen; Law Office of Michael Chen

(57) ABSTRACT

The present invention discloses a walking assistive system comprising a motion module, a current detecting module and a central control module. Each motion module includes omni-directional wheels, motors, shaft encoders and servo controllers. The omni-directional wheels are connected to and driven by the motors. The motors are connected to the shaft encoders, and the rotation speed values are generated corresponds to the rotation speed of the motors by the shaft coder. The servo controllers connected to the shaft encoders and the motors receive the rotation speed values and control the motors. The current detecting modules connected to the motors detect the current of the motors and generate current values correspondingly. The central control module connected to the motion control module and the current detecting module controls the platform compliant motion control modules according to the rotation speed values and the current values.

6 Claims, 5 Drawing Sheets

WALKING ASSISTIVE SYSTEM

FIELD

The exemplary embodiment(s) of the present invention relates to a field of walking assistive system. More specifically, the exemplary embodiment(s) of the present invention relates to a walking assistive system comprising compliance controlling and self-navigating function.

BACKGROUND

According to the latest data published in august 2008 by the Council for Economic Planning and Development (Taiwan), the social structure of Taiwan is getting an aging society, and the demand of the walking assistive apparatus to prevent the elder and the people with physical disabilities from falling down is getting higher and higher.

The Taiwan patent 395305 discloses a controller of a contacting surface of a motor. The controller keeps the contact force to the surface by calculating an external force contacting with the surface according to the angle variation of a torque spring. However, the controller does not have a function to be actively commanded by the master. Therefore, the controller lacks the adaptability when the situation is urgent.

The Taiwan patent 1274239 discloses a predictor capable of accommodating the force of a motor. The predictor predicts the external force imposed by a user according to the rotation speed of the motor, and further follows the will of the user to speed up or down to the motor. However, the predictor does not have a function be actively commanded by the master either, and lacks the adaptability when in a positive feedback environment.

The U.S. Pat. No. 6,518,718 discloses an auto-decelerating system of a motor. The system predicts the external force according to the current variation of the motor, and adjusts the force of the motor by controlling the motor voltage. However, the controller only compliance control one single motor and can not compliance control the whole platform.

The U.S. Pat. No. 7,386,365 discloses a controller of a surgical robot arm. The terminal robot arm is affected by operating the control-end robot arm. The terminal robot arm sends back the information of the force and position of the motor to the motor of each control-end robot arm correspondingly. However, the controller does not have a function to actively commands by the master either, and the controller lacks the adaptability when the situation is urgent.

In summary, the techniques relate to the walking assistive apparatus mostly lack the combination of a compliance controller and a self-navigator, and thus these prior arts could not achieve the functions of predicting the user force, self-navigating, compliance motion controlling, obstacle avoidance, slope surface walking assistant and omni-directional moving. Thus the elderly usually feel inconvenience and not humanized when using the conventional walking assistive apparatus.

SUMMARY

To solve the problems in the conventional arts, it is a primary object of the present invention to provide a walking assistive system to solve the problem that the conventional walking assistive system could not deal with urgent situations, and further increase the safety and reliability of the walking assistive system.

To achieve the above objective, a walking assistive system according to the present invention is disclosed, which comprises a plurality of motion control modules, a plurality of current detecting modules and a central control module. Each motion control module comprises a plurality of omni-directional wheels, a plurality of motors, a plurality of shaft encoders and a servo controller. The motors are connected to the omni-directional wheels to drive the walking assistive system for omni-directional moving. The servo controller is connected to the shaft encoders and the motors and controls the motors. The shaft encoders generate a plurality of rotation speed values according to the rotation speed of the motors. The current detecting modules are connected to the motors and sense the current of the motors then correspondingly generate a plurality of current values. The central control module is connected to the motion control modules and the current detecting modules, and controls the motion control modules according to the rotation speed values provided by the servo controller and the current values provided by the current detecting modules. When a user does not force on the walking assistive system, the central control module controls the motion control modules to be standing by; on the other hand, when the user forces on the walking assistive system with an external force, the central control module controls the motion control modules operating according to the external force.

Wherein the walking assistive system further comprises a tilt detector, a mobile platform localization device and an obstacle detector. The tilt detector is connected to the central control module and detects the inclination of the environment in which the walking assistive system works and correspondingly generates an inclination value. The mobile platform localization device is connected to the central control module and detects the position of the walking assistive system to correspondingly generate a position information. The obstacle detector is connected to the central control module and detects a plurality of obstacles surrounding the walking assistive system to correspondingly generate an obstacle position information.

Wherein the central control module comprises an external force predicting unit, a compliance controller unit, a navigating unit and a motion coordinating unit. The external force predicting unit connected to the tilt detector, the servo controllers and the current detecting modules generates an external force value corresponds to the external force according to the inclination value, the rotation speed values and the current values. The compliance controller unit connected to the external force predicting unit correspondingly generates a first motion command according to the external force value. The navigating unit connected to the mobile platform localization device and the obstacle detector, and correspondingly generates a second motion command according to the position information, a target position information and the obstacle information. The motion coordinating unit connected to the compliance controller unit and the navigating unit generates a weight value according to the first motion command after receiving the first motion command and the second motion command, and then generates a third motion command by modifying the second motion command according to the weight value, and controls the motion control modules according to the first motion command and the third motion command.

Wherein the external force predicting unit comprises a gravitation convertor, a speed convertor, a platform force convertor and a processor. The gravitation convertor connected to the tilt detector generates a gravitation component value according to the inclination value. The speed convertor connected to the servo controller includes a first-order low-pass filter, generates a speed value of the walking assistive system according to the rotation speed values, generates an acceleration value by the first-order low-pass filter, and then generates a motor force value according to the speed value and the acceleration value. The platform-force convertor connected to the current detecting modules generates a center-of-gravity value according to the current values. The processor connected to the gravitation convertor, the speed convertor and the platform force convertor generates the external force value by the center-of-gravity value minus the gravitation component value, a fixed friction value and the motor force value.

Wherein the navigating unit comprises a goal seeking controller, a wall following controller, an obstacle avoidance controller and a behavior integrating processor. The goal seeking controller connected to the mobile platform localization device correspondingly generates a goal seeking command according to the position information and the target position information. The wall following controller connected to the obstacle detector correspondingly generates a wall following command according to the sensory information. The obstacle avoidance controller connected to the obstacle detector generates an obstacle avoidance command according to the obstacle information. The behavior integrating processor connected to the mobile platform localization device, the obstacle detector, the goal seeking controller, the wall following controller and the obstacle avoidance controller modifies the weight ratio of the goal seeking command, the wall following command and the obstacle avoidance command according to the position information and the obstacle information, and then generates the second motion command according the modified goal seeking command, the wall following command and the obstacle avoidance command.

Wherein the motion coordinating unit connected to the compliance controller unit and the navigating unit generates a weight value according to the first motion command after receiving the first motion command and the second motion command, and then generates a third motion command by modifying the second motion command according to the weight value, and controls the motion control modules according to the first motion command and the third motion command. The range of the weight value is between 0 and 1.

With the above arrangements, the walking assistive system according to the present invention has one or more of the following advantages:

(1) The walking assistive system uses the navigating unit to navigate the walking assistive system and avoid the obstacles when the walking assistive system is under compliance control, and further increases the convenience of using the walking assistive system.

(2) The walking assistive system predicts the external force imposed on the walking assistive system according to the current and rotation speed of the motors, and control the motor according to the external force to lower the burden when the user use the walking assistive system.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiments of the present invention are described herein in the context of an illuminating system and a method thereof.

Those of ordinary skill in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

Figure 1:
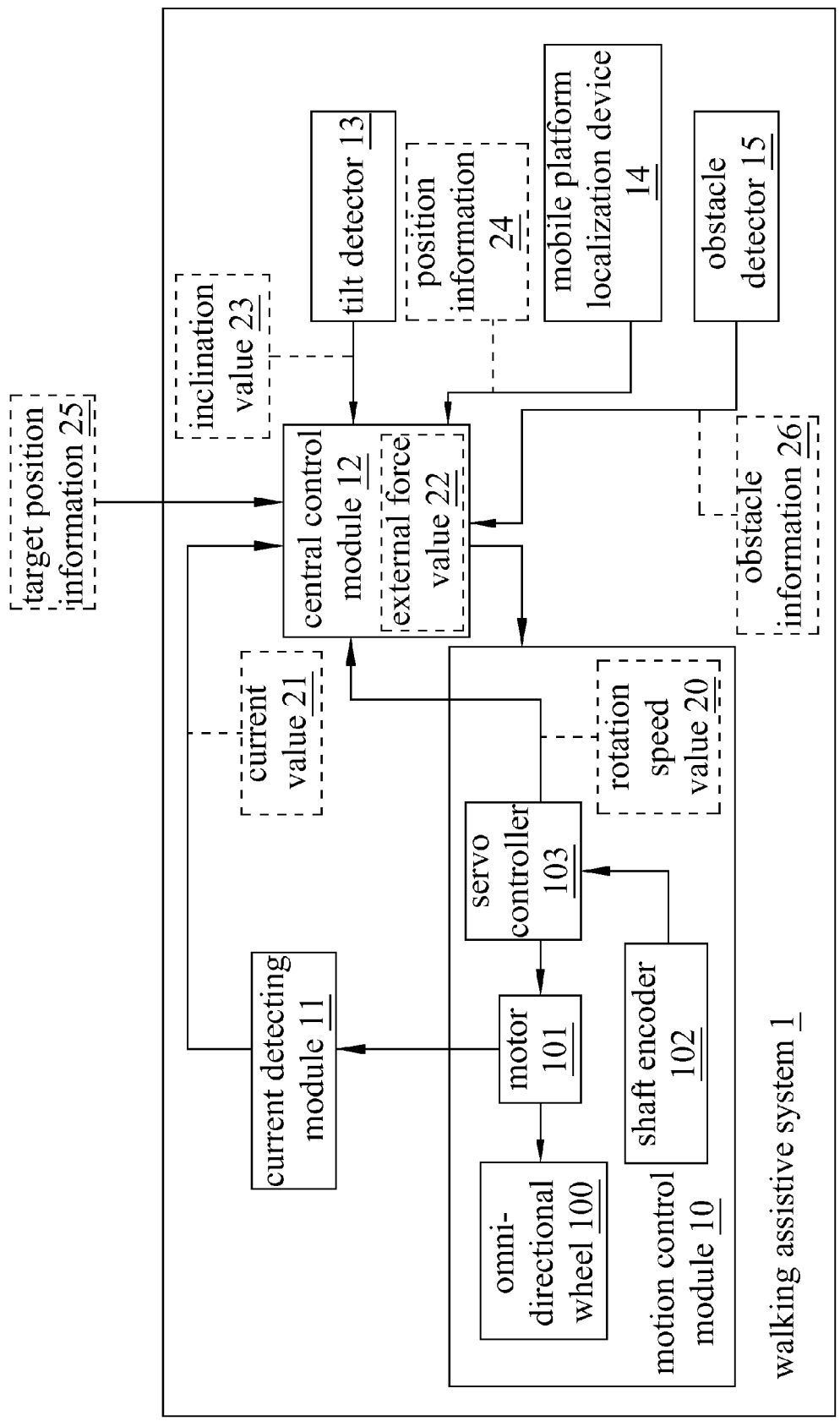
FIG. 1 illustrates a block diagram of a walking assistive system in accordance with the present invention.

Please refer to FIG. 1, which illustrates a block diagram of a walking assistive system in accordance with the present invention. As shown in this figure, the walking assistive system 1 according to the present invention is disclosed, which comprises a plurality of motion control modules 10, a plurality of current detecting modules 11 and a central control module 12. Each motion control module 10 comprises a plurality of omni-directional wheels 100, a plurality of motors 101, a plurality of shaft encoders 102 and a servo controller 103. The motors 101 are connected to the omni-directional wheels 100 and drive the omni-directional wheels 100 for omni-directional moving. The shaft encoders 102 connected to the servo controller 103 generate a plurality of rotation speed values 20 according to the rotation speed of the motors 101. The servo controller 103 connected to the shaft encoders 102 and the motors 101 controls the motors 101. The current detecting modules 11 connected to the motors 101 sense the current of the motors 101 then correspondingly generate a plurality of current values 21. The central control module 12 connected to the motion control modules 10 and the current detecting modules 11 controls the motion control modules 10 according to the rotation speed values 20 and the current values 21. When a user does not force on the walking assistive system 1, the central control module 12 controls the motion control modules 10 to be standing by; on the other hand, when the user force on the walking assistive system 1 with an external force, the central control module controls the motion control modules operating according to an external force value 22 corresponds to the external force. Besides, the walking assistive system 1 further comprises a tilt detector 13, a mobile platform localization device 14 and an obstacle detector 15. The tilt detector 13 detects the inclination of the environment in which is the walking assistive system 1 and correspondingly generates an inclination value 23. The mobile platform localization device 14 detects the position of the walking assistive system 1 to correspondingly generate a position information 24. The obstacle detector 15 detects a plurality of obstacles rounding the walking assistive system to correspondingly generate an obstacle information 26.

In some preferred embodiments, two motion control modules 10 and two current detecting modules 11 construct the walking assistive system 1 in accordance with the present invention, and each motion control modules 10 includes one servo controller 103, two motors 101 and two shaft encoders 102. In addition, each motors 101 corresponds one omni-directional wheel 100. The setting angles of the motors 101 and the omni-directional wheel 100 are 120 and 60 degrees, so the walking assistive system 1 has the ability of omni-directional moving. The central control module 12 could be an industrial computer and directly commands the servo controller 103, then the servo controller 103 outputs corresponding currents to each motor 101, and the shaft encoders 102 sends back the rotation speed to the servo controller 103. The current detecting modules 11 are tandem in the circuit of the servo controller 103 connecting to the motor 101. Each current detecting module 11 could correspondingly measures the currents values and directions of the two motors 101, and then sends back the current situation aforesaid to the central control module 12.

Figure 2:
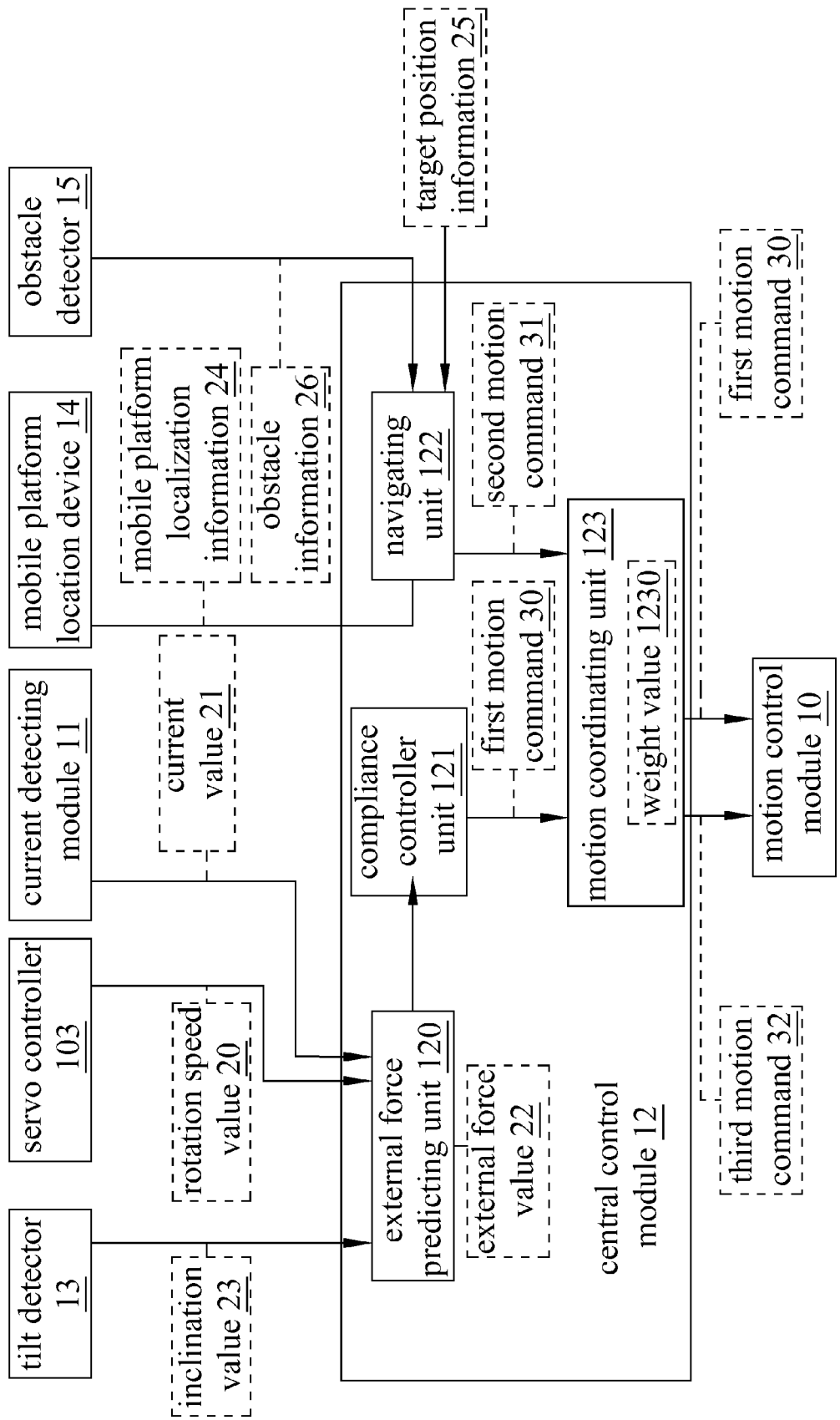
FIG. 2 illustrates a block diagram of a central control module in accordance with the present invention.

Please refer to FIG. 2, which illustrates a block diagram of a central control module in accordance with the present invention. As shown in this figure, the central control module 12 comprises an external force predicting unit 120, a compliance controller unit 121, a navigating unit 122 and a motion coordinating unit 123. The external force predicting unit 120 connected to the tilt detector 13, the servo controllers 103 and the current detecting modules 11 generates an external force value 22 corresponds to the external force according to the inclination value 23, the rotation speed values 20 and the current values 21. The compliance controller unit 121 connected to the external force predicting unit 120 correspondingly generates a first motion command 30 according to the external force value 22. The navigating unit 122 connected to the mobile platform localization device 14 and the obstacle detector 15 correspondingly generates a second motion command 31 according to the position information 24, the target position information 25 (input by the user) and the obstacle information 26. The motion coordinating unit 123 connected to the compliance controller unit 121 and the navigating unit 122 generates a weight value 1230 according to the first motion command 30 after receiving the first motion command 30 and the second motion command 31, and then generates a third motion command 32 by modifying the second motion command 31 according to the weight value 1230, and controls the motion control modules 10 according to the first motion command 30 and the third motion command 32. The range of the weight value 1230 is between 0 and 1.

In some preferred embodiments, the central control module 12 is also referred as semi-autonomous navigating system. The central control module 12 uses the external force predicting unit 120 to predict the force imposed by the user, and then uses the compliance controller unit 121 to get the walking assistive system 1 speed corresponds to the force imposed by the user, so as to accommodate the user's force to move the walking assistive system 1. After that, the central control module 12 further uses the navigating unit 122 to receive and process the environment data detected by the mobile platform localization device 14 and the obstacle detector 15, and the navigating unit 122 further commands the walking assistive system 1 avoid the obstacles and towards the pre-entered target position according to the environment data. The central control module 12 finally adjust the output of the motion commands from the navigating unit 122 and the compliance controller unit 121 with a weight value between 0 and 1, so as to harmonize the outputs of the navigating unit 122 and the compliance controller unit 121.

Figure 3:
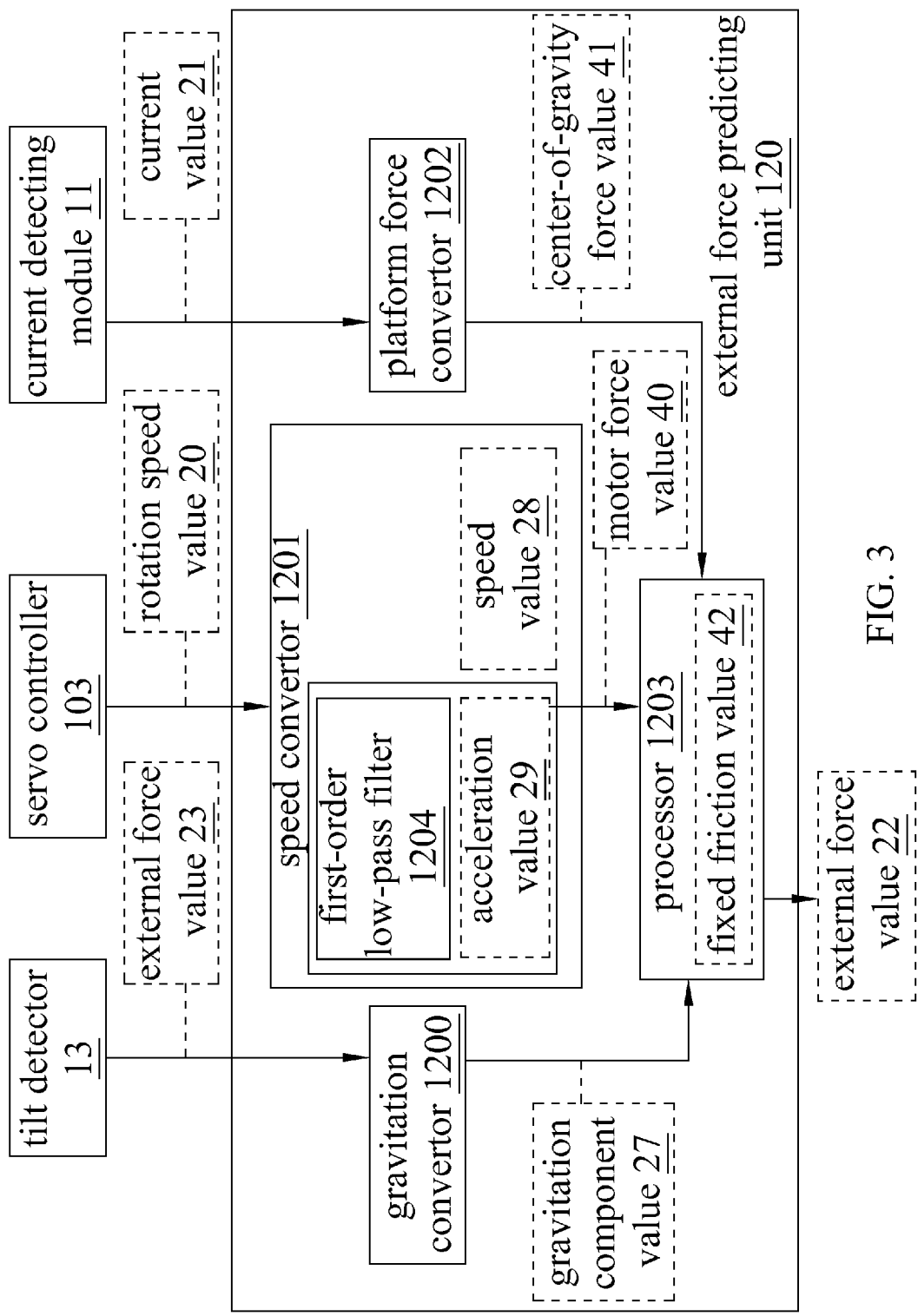
FIG. 3 illustrates a block diagram of an external force predicting unit in accordance with the present invention.

Please refer to FIG. 3, which illustrates a block diagram of an external force predicting unit in accordance with the present invention. As shown in this figure, the external force predicting unit 120 comprises a gravitation convertor 1200, a speed convertor 1201, a platform force convertor 1202 and a processor 1203. The gravitation convertor 1200 connected to the tilt detector 13 generates a gravitation component value 27 according to the inclination value 23. The speed convertor 1201 connected to the servo controller 103 includes a first-order low-pass filter 1204, generates a speed value 28 of the walking assistive system 1 according to the rotation speed values 20, generates an acceleration value 29 by the first-order low-pass filter 1204, and then generates a motor force value 40 according to the speed value 28 and the acceleration value 29. The platform force convertor 1202 connected to the current detecting modules 11 generates a center-of-gravity value 41 according to the current values 21. The processor 1203 connected to the gravitation convertor 1200, the speed convertor 1201 and the platform force convertor 1202 generates the external force value 22 by the center-of-gravity value 41 minus the gravitation component value 27, a fixed friction value 42 and the motor force value 40.

In addition, in the preferred embodiments of the walking assistive system 1 according to the present invention, the directly contact and interactions between the user and the walking assistive system 1 are considered, thus under the safety consideration, the walking assistive system 1 is designed as a passive-like rigid body: when the user does not impose the force in the walking assistive system 1, the walking assistive system 1 will be stationary; however, when the user pull or push the walking assistive system 1, the walking assistive system 1 will accommodate to the user's force and move along the direction of the force imposed by the user. In other preferred embodiments, the compliance controller unit 121 uses a mass damper model to get the force value and the force direction corresponds to the force imposed by the user on the walking assistive system 1 through the external force predicting unit 120, so as to move the walking assistive system 1 along this direction and modify the moving speed according to the force value.

Figure 4:
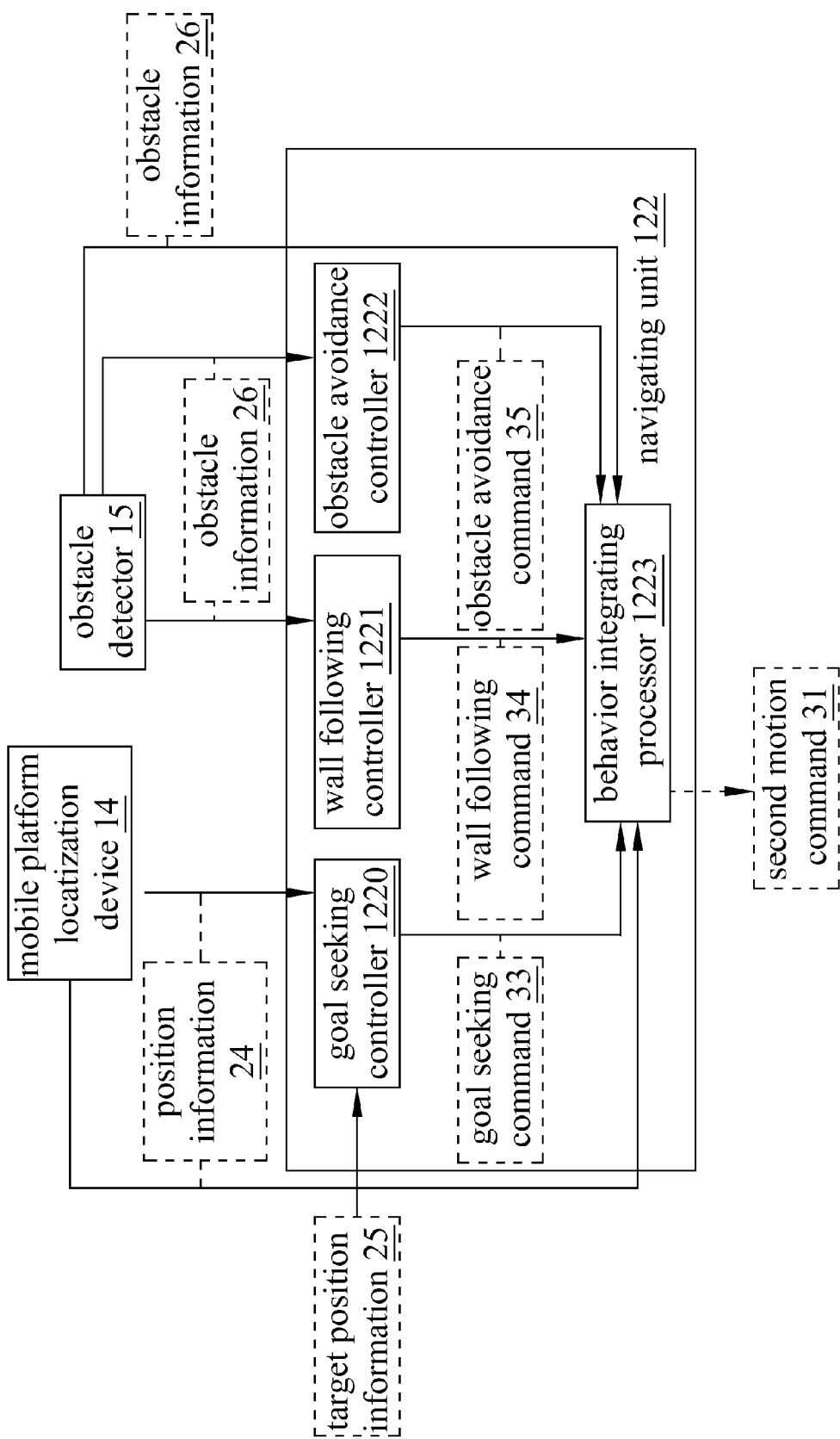
FIG. 4 illustrates a block diagram of a navigating unit in accordance with the present invention.

Please refer to FIG. 4, which illustrates a block diagram of a navigating unit in accordance with the present invention. As shown in this figure, the navigating unit 122 comprises a goal seeking controller 1220, a wall following controller 1221, an obstacle avoidance controller 1222 and a behavior integrating processor 1223. The goal seeking controller 1220 connected to the mobile platform localization device 14 correspondingly generates a goal seeking command 33 according to the position information 24 and the target position information 25 (input by the user). The wall following controller 1221 connected to the obstacle detector 15 correspondingly generates a wall following command 34 according to the obstacle information 26. The obstacle avoidance controller 1222 connected to the obstacle detector 15 generates an obstacle avoidance command 35 according to the obstacle information 26. The behavior integrating processor 1223 connected to the mobile platform localization device 14, the obstacle detector 15, the goal seeking controller 1220, the wall following controller 1221 and the obstacle avoidance controller 1222 modifies the weight ratio of the goal seeking command 33, the wall following command 34 and the obstacle avoidance command 35 according to the position information 24 and the obstacle information 26, and then generates the second motion command 31 according the modified goal seeking command 33, the wall following command 34 and the obstacle avoidance command 35.

Modifying the weight ratio of the goal seeking command 33, the wall following command 34 and the obstacle avoidance command 35 according to the position information 24 and the obstacle information 26 mainly analyzes the environment and ranks the goal seeking, the wall following and the obstacle avoidance according to the importance of each behavior in this environment. After the weights of the aforesaid behaviors (goal seeking command, wall following and obstacle avoidance) are given according to each importance, the navigating unit 122 could solve complicated problems by solving individual problems first, so as to achieve the function of autonomous navigation. The behavior integrating processor device 1223 arranges the weight of the aforesaid three behaviors, so as to indicate the importance of the aforesaid three behaviors in different environments. In some preferred embodiments, the behavior integrating processor 1223 determines if the environment match one of the typical patterns. Each typical pattern comprises the weight values of the aforesaid three behaviors (the importance of the behaviors). The weight value will be higher if the corresponding behavior is more important. For example, the weight of the obstacle avoidance is higher when the user is walking on the road with the help of the walking assistive system 1; however, the weight of the wall following is higher when the user is walking indoor with the help of the walking assistive system 1. When the behavior integrating processor 1223 determines that the environment matches one of the typical patterns, the behavior integrating processor 1223 gives the aforesaid three behaviors corresponding weight values respectively, and generates the second motion command 31 according the weight-modified goal seeking command 33, the wall following command 34 and the obstacle avoidance command 35; and when the behavior integrating processor 1223 determines that the environment doesn't match one of the typical patterns, the behavior integrating processor 1223 determines the similarity between the environment and the typical patterns and then the weight values are given to the aforesaid three behaviors.

Figure 5:
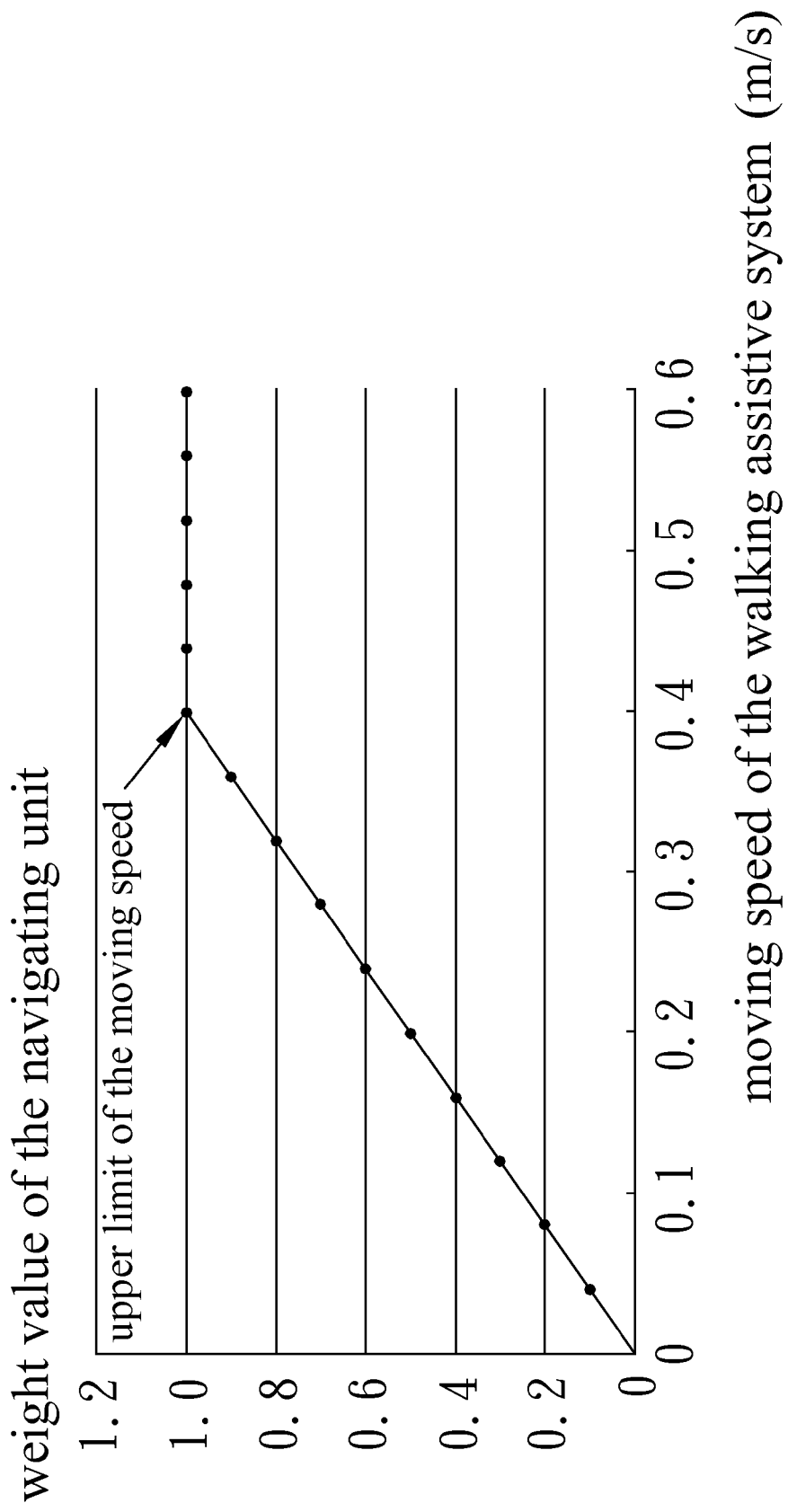
FIG. 5 illustrates a schematic diagram of a central controller giving a weight value to the navigating unit in accordance with the present invention.

Please refer to FIG. 5, which illustrates a schematic diagram of a central control module giving a weight value to the navigating unit in accordance with the present invention. As shown in this figure, after the user forcing the walking assistive system, the central control module could get the moving speed of the walking assistive system along the direction of the force imposed by the user. When the moving speed is zero, the walking assistive system stays at the original place, so the outputs of the navigating unit is no need, and thus the motion coordinating unit gives a zero weight value to the navigating unit, and the motor and the omni-directional wheel will not receive the outputs of the navigating unit. When the moving speed of the walking assistive system is 0.2 m/s, which is the half of the upper limit of the moving speed of the walking assistive system, the motion coordinating unit gives a 0.5 weight value to the navigating unit. The navigating unit is designed for the situation that the walking assistive system is operated at full moving speed, thus when the moving speed is half of the full moving speed, the navigating unit will be 0.5 to represent the autonomous navigation function at this moving condition. When the moving speed of the walking assistive system is 0.4 m/s (full speed), the motion coordinating unit gives 1 weight value to the navigating unit so as to represent the autonomous navigation function at this moving condition. When the moving speed of the walking assistive system is higher then 0.4 m/s (full speed), which is higher the predetermined upper limit of the moving speed, the walking assistive system will move with merely 0.4 m/s, and thus the weight value of the navigating unit is still 1 under this condition.

In summary, the walking assistive system in accordance with the present invention could use the navigating unit to navigate the walking assistive system and dodge avoid the obstacles when the walking assistive system is under compliance controlled and further increases the convenience of using the walking assistive system; the walking assistive system could further predict the external force imposed on the walking assistive system according to the current and rotation speed of the motors, and control the motor according to the external force to lower the burden when the user use the walking assistive system.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A walking assistive system, comprising:
   a plurality of motion control modules, each motion control module comprising:
      a plurality of omni-directional wheels, for omni-directional moving;
      a plurality of motors, connected to the omni-directional wheels and driving the omni-directional wheels;
   a servo controller, connected to the motors and controlling the motors; and
      a plurality of shaft encoders, connected to the servo controller, generating a plurality of rotation speed values according to the rotation speed of the motors;
   a plurality of current detecting modules, connected to the motors, sensing the current of the motors then correspondingly generating a plurality of current values; and
   a central control module, connected to the motion control modules and the current detecting modules, controlling the motion control module according to the rotation speed values provided by the servo controller and the current values provided by the current detecting modules;
   when a user does not force on the walking assistive system, the central control module controls the motion control modules to be standing by;
   when the user force on the walking assistive system with a external force, the central control module controls the motion modules operating according to the external force.

2. The walking assistive system of claim 1, further comprising:
   a tilt detector, connected to the central control module, detecting the inclination of the environment existing the walking assistive system and correspondingly generating an inclination value;
   a mobile platform localization device, connected to the central control module, detecting the position of the walking assistive system to correspondingly generating a position information; and
   an obstacle detector, connected to the central control module, detecting a plurality of obstacles rounding the walking assistive system to correspondingly generating an obstacle information.

3. The walking assistive system of claim 2, wherein the central control module comprises:
- an external force predicting unit, connected to the tilt detector, the servo controllers and the current detecting modules, generates an external force value corresponds to the external force according to the inclination value, the rotation speed values and the current values;
- a compliance controller unit, connected to the external force predicting unit, correspondingly generates a first motion command according to the external force value;
- a navigating unit, connected to the mobile platform localization device and the obstacle detector, correspondingly generates a second motion command according to the mobile platform localization information, a target position information and the obstacle information; and
- a motion coordinating unit, connected to the compliance controller unit and the navigating unit generates a weight value according to the first motion command after receiving the first motion command and the second motion command, and then generates a third motion command by modifying the second motion command according to the weight value, and controls the motion modules according to the first motion command and the third motion command.

4. The walking assistive system of claim 3, wherein external force predicting unit comprises:
- a gravitation convertor, connected to the tilt detector generates a gravitation component value according to the inclination value;
- a speed convertor, connected to the servo controller includes a first-order low-pass filter, generates a speed value of the walking assistive system according to the rotation speed values, generates a acceleration value by the first-order low-pass filter, and then generates a motor force value according to the speed value and the acceleration value;
- a platform-force convertor, connected to the current detecting modules generates a center-of-gravity value according to the current values; and
- a processor, connected to the gravitation convertor, the speed convertor and the platform-force convertor generates the external force value by the center-of-gravity value minus the gravitation component value, a fixed friction value and the motor force value.

5. The walking assistive system of claim 3, wherein the navigating unit comprises:
- a goal seeking controller, connected to the mobile platform localization device correspondingly generates a goal seeking command according to the position information and the target position information;
- a wall following controller, connected to the obstacle detector correspondingly generates a wall following command according to the obstacle information;
- an obstacle avoidance controller, connected to the obstacle detector generates an obstacle avoidance command according to the obstacle information; and
- a behavior integrating processor, connected to the mobile platform localization device, the obstacle detector, the goal seeking controller, the wall following controller and the obstacle avoidance controller modifies the weight ratio of the goal seeking command, the wall following command and the obstacle avoidance command according to the position information and the obstacle information, and then generates the second motion command according the modified goal seeking command, the wall following command and the obstacle avoidance command.

6. The walking assistive system of claim 3, wherein the range of the weight value is between 0 and 1.

\* \* \* \* \*